(12) United States Patent
Kayanoki

(10) Patent No.: US 6,890,644 B2
(45) Date of Patent: May 10, 2005

(54) TRANSPARENT LAMINATE, PLASTIC LENS FOR EYEGLASS AND PRIMER COMPOSITION

(75) Inventor: Hisayuki Kayanoki, Ichihara (JP)

(73) Assignee: Nippon Arc Co., Ltd., Chiba (JP)

( * ) Notice: Subject to any disclaimer, the term of this patent is extended or adjusted under 35 U.S.C. 154(b) by 0 days.

(21) Appl. No.: 10/069,918

(22) PCT Filed: Jul. 4, 2001

(86) PCT No.: PCT/JP01/05814
§ 371 (c)(1),
(2), (4) Date: Mar. 1, 2002

(87) PCT Pub. No.: WO02/02676
PCT Pub. Date: Jan. 10, 2002

(65) Prior Publication Data
US 2002/0159160 A1 Oct. 31, 2002

(30) Foreign Application Priority Data
Jul. 5, 2000 (JP) ........................................ 2000-204051

(51) Int. Cl.$^7$ ............................ B32B 19/02; G02C 7/02; G02B 3/00
(52) U.S. Cl. ....................... 428/323; 428/328; 428/329; 428/423.1; 428/425.9; 351/177; 359/642; 523/334
(58) Field of Search ............................ 523/334; 428/328, 428/423.1, 425.9, 323, 329; 359/642; 351/177

(56) References Cited

U.S. PATENT DOCUMENTS 5,496,641 A  *  3/1996  Mase et al. ............... 428/423.1

FOREIGN PATENT DOCUMENTS

| EP | 0 791 636 | 8/1997 |
|---|---|---|
| EP | 0 922 971 | 6/1999 |
| JP | 4-178418 | 6/1992 |
| JP | 7-325201 | 12/1995 |
| JP | 8-505896 | 6/1996 |
| JP | 9-291227 | 11/1997 |
| JP | 9-329701 | 12/1997 |
| JP | 10-332902 | 12/1998 |
| JP | 2000-162403 | 6/2000 |

* cited by examiner

Primary Examiner—Monique R. Jackson
(74) Attorney, Agent, or Firm—Wenderoth, Lind & Ponack, L.L.P.

(57) ABSTRACT

A novel primer composition which does not need to be thermally cured at a high temperature after it is applied to a plastic substrate and a transparent laminate, for example, a plastic lens for spectacles, which comprises the above primer composition and has high impact resistance and high heat resistance even when a transparent anti-reflection coat is formed. This transparent laminate comprises a transparent plastic substrate and a coating film formed on at least one side of the plastic substrate by applying and curing a liquid primer composition which comprises (A) a self-emulsifiable emulsion of a linear polyurethane having a pendant carboxylic acid group and no crosslinked structure between polymer chains, (B) a sol of an inorganic oxide having a hydrophobic group on the surface, and (C) a compound having 5 to 9 carbon atoms and at least one hydroxyl group and at least one oxygen atom other than an oxygen atom constituting a hydroxyl group in the molecule.

15 Claims, No Drawings

TRANSPARENT LAMINATE, PLASTIC LENS FOR EYEGLASS AND PRIMER COMPOSITION

FIELD OF THE INVENTION

The present invention relates to a transparent laminate, a plastic lens for spectacles and a primer composition used for the production of the same. More specifically, it relates to a transparent laminate having high heat resistance and high impact resistance and a primer composition which does not need to be thermally cured at a high temperature and is suitable for the production of a transparent laminate, for example, a plastic lens for spectacles.

PRIOR ART

Since plastic lenses are easily scratched, they are coated with a hard coat. An anti-reflection coat is further formed on the plastic lenses by depositing an inorganic substance to suppress reflection from the surface in most cases. When a hard coat or an anti-reflection coat is formed on the surface of a lens, the impact resistance of the lens deteriorates, whereby the lens is easily broken. To prevent this, a primer is applied to the lens.

Meanwhile, to reduce the thickness of a lens, the refractive index of aplastic lens substrate must be increased. When the refractive index of a lens substrate is higher than 1.50, for example, the refractive index of a hard coat or a primer must be made equal to that of the lens substrate in order to suppress an interference fringe generated by a difference in refractive index between the hard coat or primer and the lens substrate or a difference in film thickness between them. It is proposed to add an oxide having a high refractive index, such as $TiO_2$, to a hard coat or primer in order to increase its refractive index (refer to JP-A 07-325201 and JP-A 10-332902) (the term "JP-A" as used herein means an "unexamined published Japanese patent application").

After a primer is applied to a lens substrate, the primer must be heated to be cured. When the lens substrate has a high refractive index and low heat resistance, it must be cured at a low temperature for a long time, resulting in reduced productivity.

There is proposed a primer for obtaining a coating film by applying a thermoplastic urethane polymer to avoid heating and evaporating a solvent (published Japanese translation of PCT international publication No. 8-505896 for patent application). However, when an oxide sol having a high refractive index which is generally available on the market is added to this primer to obtain a high-refractive index primer, the obtained coating film may become cloudy or the solution may gel. Therefore, the primer cannot stand long-time use. A primer which comprises an urethane elastomer and inorganic fine particles surface treated with a specific organic silane is also proposed (JP-A 9-291227). However, a transparent primer solution having long-term stability is not always obtained from a combination of the above components.

SUMMARY OF THE INVENTION

It is an object of the present invention to provide a novel primer composition which does not need to be thermally cured at a high temperature after it is applied to a plastic substrate.

It is another object of the present invention to provide a transparent laminate, for example, a plastic lens for spectacles, which comprises the above primer composition of the present invention and has high impact resistance and high heat resistance even when a transparent anti-reflection coat is formed.

Other objects and advantages of the present invention will become apparent from the following description.

According to the present invention, firstly, the above objects and advantages of the present invention are attained by a transparent laminate comprising a transparent plastic substrate and a coating film formed on at least one side of the substrate, wherein the coating film is formed by applying a liquid primer composition comprising (A) a self-emulsifiable emulsion of a linear polyurethane having a pendant carboxylic acid group and no crosslinked structure between polymer chains, (B) a sol of an inorganic oxide having a hydrophobic group on the surface, and (C) a compound having 5 to 9 carbon atoms and at least one hydroxyl group and at least one oxygen atom other than an oxygen atom constituting a hydroxyl group in the molecule, and by curing it.

According to the present invention, secondly, the above objects and advantages of the present invention are attained by a liquid primer composition comprising (A) a self-emulsifiable emulsion of a polyurethane having a pendant carboxylic acid group and no crosslinked structure between polymer chains, (B) a sol of an inorganic oxide having a hydrophobic group on the surface, and (C) a compound having 5 to 9 carbon atoms and at least one hydroxyl group and at least one oxygen atom other than an oxygen atom constituting a hydroxyl group in the molecule.

DETAILED DESCRIPTION OF THE PREFERRED EMBODIMENTS

The present invention will be described hereinbelow.

The self-emulsifiable emulsion (A) used in the present invention is a self-emulsifiable emulsion of a linear polyurethane having a pendant carboxylic acid group and no crosslinked structure between polymer chains.

The polyurethane is obtained by reacting a compound having a carboxylic acid group and two hydroxyl groups, an aliphatic diisocyanate and a polyester diol, polyether diol or polycarbonate diol each having two hydroxyl groups. A diamine may be coexistent in this reaction as required. In this case, an urea group is formed by a reaction between the diamine and the diisocyanate. It should be understood that the linear polyurethane in the present invention includes a polyurethane containing such an urea group. The amount of the urea group is preferably 100 mol % or less based on the urethane group.

Examples of the compound having a carboxylic acid group and two hydroxyl groups include 2,2-bis(hydroxymethyl)-n-butyric acid and propionic acid.

Examples of the aliphatic diisocyanate include hexamethylene diisocyanate, 1,3,3-trimethylhexamethylene diisocyanate, isophorone diisocyanate, 4,4'-dicyclohexylmethane diisocyanate, hydrogenated xylylene diisocyanate and hydrogenated diphenylmethane diisocyanate.

Preferred examples of the diamine include aliphatic diamines such as ethylenediamine and hexamethylenediamine.

When a self-emulsifiable emulsion of a crosslinked polyurethane having a crosslinked structure between polymer chains is used in place of the self-emulsifiable emulsion of a linear polyurethane of the present invention, the coating film is readily whitened, the impact resistance of an article coated with the coating film is not high, and the liquid primer composition readily gels quickly. When a self-emulsifiable emulsion of a linear polyurethane having no pendant carboxylic acid group is used, a primer coat dissolves in a solvent for a hard coat solution to be further applied to the coating film of this liquid primer composition and contaminates the hard coat solution easily.

The polyurethane in the present invention preferably has a bisphenol A skeleton. When a polyurethane having no bisphenol A skeleton is used in combination with a $SiO_2$ sol to be described hereinafter, there will be no problem. However, when this polyurethane is used in combination with a sol of a composite oxide to be described hereinafter, the obtained film may be whitened or the impact resistance of an article coated with the coating film may lower. When a polyurethane having a bisphenol A skeleton is used in combination with composite oxide fine particles, the whitening of the film can be prevented and high impact resistance can be obtained.

The above polyurethane preferably has a number average molecular weight of 100,000 to 1,000,000.

The self-emulsifiable emulsion of the above polyurethane can be produced by adding the above polyurethane to an aqueous medium containing a basic compound such as an aliphatic amine or aromatic amine and stirring. The above polyurethane is emulsified to particles with diameter of 10 to 50 nm.

The solids content of the self-emulsifiable emulsion is adjusted to preferably 50 wt % or less, more preferably 20 to 48 wt %.

The self-emulsifiable emulsion used in the present invention may be acquired under the name of Neo Rez (trademark) of Abisia Co., Ltd. or Adecabontiter (trademark) of Asahi Denka Kogyo K.K.

The self-emulsifiable emulsion preferably gives a coating film having an elongation of 240 to 500% and a 100% modulus of 190 kgf/cm$^2$ or more.

Since the coating film becomes hard by the dispersion of inorganic oxide fine particles to be described hereinafter into the resin, the resin preferably has the above physical properties. A coating film having an elongation of more than 500% has high thermoplasticity and the heat resistance of an article coated with this coating film tends to deteriorate. When the elongation is less than 240%, the impact resistance tends to lower. When the 100% modulus is 190 kgf/cm$^2$ or more, excellent impact resistance and heat resistance are obtained.

The component (B) used in the present invention is a sol of an inorganic oxide having a hydrophobic group on the surface. The inorganic oxide fine particles of this sol increases the hardness, heat resistance and weatherability of the coating film. Inorganic oxide fine particles containing an oxide of Ti or Zr enhance the refractive index of the coating film and serves to prevent the generation of an interference fringe. The whitening of the coating film can be prevented by making a hydrophobic group existent on the surface of each inorganic oxide fine particle.

Examples of the hydrophobic group include an alkyl group, alkyl group substituted by an acryloxy group, alkyl group substituted by a methacryloxy group, alkyl group substituted by a glycidyloxy group and alkylene glycol group having an alkyl group at one terminal. Out of these, an alkyl group substituted by an acryloxy group and an alkyl group substituted by a methacryloxy group are particularly preferred because a coating film having high stability is obtained. The whitening of the coating film cannot be prevented when an amino group or an ureido group which is not a hydrophobic group is made existent on the surface of the inorganic oxide fine particle.

The inorganic oxide of the sol (B) is an oxide of at least one element selected from the group consisting of Si, Al, Sn, Sb, Ta, Ce, La, Fe, Zn, W, Zr, In and Ti and the surface of the inorganic oxide fine particle is modified by an organic silane compound represented by the following formula (1) to have hydrophobic groups R$^1$ and R$^2$ on the surface:

$$R^1R^2_aSiX_b \qquad (1)$$

wherein R$^1$ is an alkyl group which may be substituted by a methacryloxy group or glycidyloxy group, R$^2$ is an alkyl group, X is a hydrolyzable group, a is 0, 1 or 2, and b is 1, 2 or 3, with the proviso that a+b=3.

The above oxide may be an oxide of a single element or a composite oxide of two or more elements. Examples of the inorganic oxide include silicon, oxide, aluminum oxide, tin oxide, antimonyoxide, tantalumoxide, ceriumoxide, lanthanum oxide, iron oxide, zinc oxide, tungsten oxide, zirconium oxide, indium oxide, titanium oxide, composite oxide of titanium oxide/zirconium oxide and composite oxide of titanium oxide/zirconium oxide/silicon oxide. The composite oxide preferably contains at least 50 wt % of titanium oxide. The inorganic oxide preferably has a particle diameter of 1 to 100 nm.

Examples of the organic silane compound represented by the above formula (1) include methyl trimethoxysilane, γ-acryloxypropyltrimethoxysilane, γ-acryloxypropyltriethoxysilane, γ-acryloxypropylmethyldimethoxysilane, γ-acryloxypropylmethyldiethoxysilane, γ-methacryloxypropyltrimethoxysilane, γ-methacryloxypropyltriethoxysilane, γ-methacryloxypropylmethyldimethoxysilane, γ-methacryloxypropylmethyldiethoxysilane, trimethylchlorosilane, glycidyloxymethyltrimethoxysilane, α-glycidyloxyethyltrimethoxysilane, γ-glycidyloxypropyltrimethoxysilane and γ-glycidyloxypropylmethyldiethoxysilane.

The modification of the above oxide fine particle by the organic silane compound may be carried out by hydrolyzing the organic silane compound in the presence of the inorganic oxide particle and a catalyst in a lower alcohol such as ethanol under the reflux of the lower alcohol. As for the ratio of the oxide fine particle to the organic silane compound, the organic silane compound is used in an amount of preferably 0.4 to 2.5 parts by weight, more preferably 0.5 to 1.5 parts by weight based on 1 part by weight of the inorganic oxide.

The inorganic oxide fine particle of the sol (B) is a $SiO_2$ fine particle whose surface is modified by a hydroxy compound selected from the group consisting of a lower alcohol having 1 to 5 carbon atoms, propylene glycol monoalkyl ether having 4 to 8 carbon atoms and ethylene glycol monoalkyl ether having 3 to 8 carbon atoms to have a hydrophobic group such as an alkyl group or an alkylene glycol group having an alkyl group at the other terminal on the surface.

The surface modification of $SiO_2$ is preferably carried out by heating the $SiO_2$ fine particle in the presence of a catalyst in the above hydroxy compound.

Examples of the lower alcohol having 1 to 5 carbon atoms include methanol, ethanol, propanol, butanol and hexanol. The alcohol may be linear or branched. The alkyl group of the propylene glycol monoalkyl ether having 4 to 8 carbon atoms may be linear or branched and is an alkyl group having 1 to 5 carbon atoms such as methyl, ethyl, n-propyl, iso-propyl, butyl or pentyl. Similarly, the alkyl group of the ethylene glycol monoalkyl ether having 3 to 8 carbon atoms may be linear or branched and is an alkyl group having 1 to 6 carbon atoms such as alkyl group having 1 to 5 carbon atoms or a hexyl group.

The dispersant for the inorganic oxide fine particle having a hydrophobic group on the surface is water, alcohol or organic solvent having compatibility with water. The above alcohol is a saturated aliphatic alcohol such as methanol, ethanol, isopropyl alcohol, n-butanol or 2-butanol. Examples of the organic solvent having compatibility with water include cellosolves such as methyl cellosolve, ethyl cellosolve, propyl cellosolve and butyl cellosolve, propylene glycol derivatives such as propylene glycol monomethyl ether, propylene glycol monoethyl ether and propylene glycol monomethyl ether acetate, and esters such as methyl acetate, ethyl acetate and butyl acetate. Out of these, a lower alcohol (chain alcohol having 1 to 5 carbon atoms) is preferably used. However, since the liquid primer composition gels quickly by use of a lower alcohol as will be described hereinafter, the amount of the lower alcohol is preferably as small as possible. The quick gelation of the liquid primer composition can be prevented by adding N-methylpyrrolidone to a lower alcohol solvent for the inorganic oxide sol or the liquid primer composition. However, when the amount of N-methylpyrrolidone is large, it readily corrodes the plastic substrate so its amount must be small.

The compound having 5 to 9 carbon atoms and at least one hydroxyl group and at least one oxygen atom other than an oxygen atom constituting a hydroxyl group in the molecule which is the component (C) to be described hereinafter may be used as a dispersion solvent for the inorganic oxide fine particle as well.

The component (C) used in the present invention is a compound having 5 to 9 carbon atoms and at least one hydroxyl group and at least one oxygen atom other than an oxygen atom constituting a hydroxyl group in the molecule. This compound has compatibility with water and a higher boiling point than the boiling point (100° C.) of water.

The compound is a monoalkyl ether of alkylene glycol, monoalkyl ether of polyalkylene glycol, monoacyl ester of alkylene glycol, monoacyl ester of polyalkylene glycol, 3-methoxy-3-methyl-1-butanol or diacetone alcohol. Specific examples of the compound include monoalkyl ethers (the number of carbon atoms of the alkyl group is 3 to 7) of ethylene glycol, monoalkyl ethers (the number of carbon atoms of the alkyl group is 1 to 5) of diethylene glycol, monoacyl esters (the number of carbon atoms of the acyl group is 3 to 7) of ethylene glycol, monoacyl esters (the number of carbon atoms of the acyl group is 1 to 5) of diethylene glycol, propylene glycol monoalkyl ethers (the number of carbon atoms of the alkyl group is 1 to 4) and propylene glycol monoacyl esters (the number of carbon atoms of the acyl group is 3 to 6).

By using the above compound (C), the liquid primer composition of the present invention can be existent as a stable solution for a long time.

When an alcohol having a low molecular weight with 4 or less carbon atoms is used as a solvent in place of the above compound (C), the alcohol permeates the inside of each particle of an urethane emulsion abruptly, thereby swelling the molecule and increasing the viscosity of the urethane emulsion with the result that the liquid primer composition gels quickly disadvantageously.

The liquid primer composition comprising the above components (A), (B) and (C) of the present invention preferably contains 5 to 400 parts by weight (in terms of an inorganic oxide) of the component (B) and 50 to 3,000 parts by weight of the component (C) based on 100 parts by weight (in terms of nonvolatilematter) of the component (A). 50 to 3,000 parts by weight of the component (C) includes a dispersant used for the component (B). More preferably, the liquid primer composition comprises 20 to 250 parts (in terms of an inorganic oxide) of the component (B) and 80 to 2,000 parts by weight of the component (C) based on 100 parts by weight (in terms of nonvolatile matter) of the component (A).

Since the lower alcohol preferably used as the dispersant for the component (B) readily exerts a bad influence upon the stability of the liquid primer composition as described above, the amount of the lower alcohol is preferably 50 wt % or less based on the amount (50 to 3,000 parts by weight) of the component (C).

Water is preferably used to adjust the viscosity of the liquid primer composition, accordingly, the thickness of the coating film, and the amount thereof including water as a dispersant for the component (A) is preferably 0.5 to 10 times the weight of the component (C).

The liquid primer composition of the present invention may contain a leveling agent, lubricity providing agent, ultraviolet light absorber, antioxidant, antistatic agent bluing agent and the like as required. The liquid primer composition may further contain a crosslinking agent for a polymer and a catalyst for promoting a crosslinking reaction. The leveling agent and the lubricity providing agent are particularly preferably a copolymer of a polyoxyalkylene and polydimethylsiloxane or a copolymer of a polyoxyalkylene and fluorocarbon. They may be contained in the liquid primer composition in an amount of 0.001 to 10 wt %.

The liquid coating composition of the present invention is applied to at least one side of a transparent plastic substrate to thereby provide the transparent laminate of the present invention having a coating film.

The transparent plastic substrate is not limited to a particular kind and may be a polycarbonate, acrylic resin, polyurethane resin or episulfide-based polymer. When the transparent plastic substrate is a lens for spectacles, it is preferably a polyurethane resin, polymethacrylic resin, polyacrylic resin or episulfide-based polymer.

The application of the primer composition to the transparent plastic substrate may be carried out by dip-coating, flow-coating, spin-coating, spray-coating or the like. After application, the primer composition is heated at 50 to 90° C. for several minutes to 30 minutes to form a cured coating film. The thickness of the coating film is preferably 0.1 to 5 μm, more preferably 0.2 to 3 μm. When the thickness of the coating film is smaller than 0.1 μm, the effect of improving impact resistance is small and when the thickness of the coating film is larger than 5 μm, the hardness may be reduced after a hard coat is formed.

The transparent laminate of the present invention may further have a hard coat on the exterior surface of the coating film of the above liquid primer composition. The hard coat is a silicon resin-based film, for example, a film of a composition containing (D) a sol of an inorganic oxide fine particle selected from the group consisting of oxides of Si, Al, Sn, Sb, Ta, Ce, La, Fe, Zn, W, Zr, In and Ti and having a particle diameter of 1 to 100 nm and (E) an epoxy-containing silicon compound represented by the following formula (2) or a hydrolyzate thereof:

$$R^3R^4_dSi(OR^5)_{3-d} \quad (2)$$

wherein $R^3$ is a group having an epoxy group and 2 to 12 carbon atoms, $R^4$ is an alkyl group or haloalkyl group having 1 to 6 carbon atoms, alkenyl group having 2 to 6 carbon atoms, phenyl group or halophenyl group, $R^5$ is a hydrogen atom, alkyl group having 1 to 4 carbon atoms or acyl group, and d is 0, 1 or 2.

The above sol of an inorganic oxide improves the hardness, heat resistance and weatherability of the hard coat. The inorganic oxide fine particle containing an oxide of Ti or Zr increases the refractive index of the hard coat to a value close to the refractive index of the above primer coat to prevent the generation of an interference fringe. Examples of the above inorganic oxide include $SiO_2$, $Al_2O_3$, $SnO_2$, $Sb_2O_5$, $Ta_2O_5$, $CeO_2$, $La_2O_3$, $Fe_2O_3$, ZnO, $WO_3$, $ZrO_2$, $In_2O_3$ and $TiO_2$. These inorganic oxides are preferably in the form of a fine particle having a particle diameter of 1 to 100 μm.

These inorganic oxides are surface treated with an organic silane compound as required to enhance dispersibility in a solvent. The surface treatment may be carried out with an organic silane compound or a hydrolyzate thereof. The organic silane compound is preferably used in an amount of 20 wt % or less based on the inorganic oxide.

Examples of the organic silicon compound include compounds represented by the following formulas (3), (4), (5) and (6).

$$R^6{}_3SiX \qquad (3)$$

wherein a plurality of $R^6$'s may be the same or different and each an organic group having an alkyl group, phenyl group, vinyl group, methacryloxy group, mercapto group, amino group or epoxy group, and X is a hydrolyzable group.

$$R^6{}_2SiX_2 \qquad (4)$$

wherein $R^6$ and X are as defined in the above formula (3), with the proviso that a plurality of X's may be the same or different.

$$R^6SiX_3 \qquad (5)$$

wherein $R^6$ and X are as defined in the above formula (3).

$$SiX_4 \qquad (6)$$

wherein X is as defined in the above formula (3).

Examples of the compound represented by the above formula (3) include trimethylmethoxysilane, triethylmethoxysilane, trimethylethoxysilane, triethylethoxysilane, triphenylmethoxysilane, diphenylmethylmethoxysilane, phenyldimethylmethoxysilane, phenyldimethylethoxysilane, vinyldimethylmethoxysilane, vinyldimethylethoxysilane, acryloxypropyldimethylmethoxysilane, γ-methacryloxypropyldimethylmethoxysilane, γ-mercaptopropyldimethylmethoxysilane, γ-mercaptopropyldimethylethoxysilane, N-β(aminoethyl)γ-aminopropyldimethylmethoxysilane, γ-aminopropyldimethylmethoxysilane, γ-aminopropyldimethylethoxysilane, γ-glycidoxypropyldimethylmethoxysilane, γ-glycidoxypropyldimethoxyethoxysilane and β-(3.4-epoxycyclohexyl)ethyldimethylmethoxysilane.

Examples of the compound represented by the above formula (4) included dimethyldimethoxysilane, diethyldimethoxysilane, dimethyldiethoxysilane, diethyldiethoxysilane, diphenyldimethoxysilane, phenylmethyldimethoxysilane, phenylmethyldiethoxysilane, vinylmethyldimethoxysilane, vinylmethyldiethoxysilane, γ-acryloxypropylmethyldimethoxysilane, γ-methacryloxypropyldimethyldimethoxysilane, γ-mercaptopropylmethyldimethoxysilane, γ-mercaptopropylmethyldiethoxysilane, N-β(aminoethyl)γ-aminopropylmethyldimethoxysilane, γ-aminopropylmethyldimethoxysilane, γ-aminopropylmethyldiethoxysilane, γ-glycidoxypropylmethyldimethoxysilane, γ-glycidoxypropylmethoxydiethoxysilane and β-(3.4-epoxycyclohexyl)ethylmethyldimethoxysilane.

Examples of the compound represented by the above formula (5) include methyltrimethoxysilane, ethyltrimethoxysilane, methyltriethoxysilane, ethyltriethoxysilane, phenyltrimethoxysilane, phenyltriethoxysilane, vinyltrimethoxysilane, vinyltriethoxysilane, vinyl(β-methoxyethoxy)silane, γ-acryloxypropyltrimethoxysilane, γ-methacryloxypropyltrimethoxysilane, γ-mercaptopropyltrimetboxysilane, γ-mercaptopropyltriethoxysilane, N-β(aminoethyl)γ-aminopropyltrimethoxysilane, γ-aminopropyltrimethoxysilane, γ-aminopropyltriethoxysilane, γ-glycidoxypropyltrimethoxysilane, β-glycidoxypropyltrimethoxysilane, γ-glycidoxypropyltriethoxysilane, β-glycidoxypropyltriethoxysilane and β-(3.4-epoxycyclohexyl)ethyltrimethoxysilane.

Examples of the compound represented by the above formula (6) include tetraethyl orthosilicate and tetramethyl orthosilicate.

Examples of the dispersant for the above sol of an inorganic oxide include water, saturated aliphatic alcohols, cellosolves, propylene glycol derivatives, esters, ethers, ketones, aromatic hydrocarbons and other solvents.

The saturated aliphatic alcohols include methanol, ethanol, isopropyl alcohol, n-butanol and 2-butanol; the cellosolves include methyl cellosolve, ethyl cellosolve, propyl cellosolve and butyl cellosolve; the propylene glycol derivatives include propylene glycol monomethyl ether, propylene glycol monoethyl ether and propylene glycol monomethyl acetate; the esters include methyl acetate, ethyl acetate and butyl acetate; the ethers include diethyl ether and methyl isobutyl ether; the ketones include acetone and methyl isobutyl ketone; the aromatic hydrocarbons include xylene and toluene; and the other solvents include ethylene glycol, tetrahydrofuran, N,N-dimethylformamide and dichloroethane.

The amount of the inorganic oxide is, for example, 5 to 80 parts by weight, preferably 10 to 40 parts by weight based on 100 parts by weight of the sol.

The other component for forming the hard coat composition is an epoxy-containing silicon compound represented by the above formula (2) or a hydrolyzate thereof. The epoxy-containing silicon compound or hydrolyzate thereof is preferably contained in the hard coat composition in an amount of 5 to 60 wt %.

Examples of the epoxy-containing silicon compound include γ-glycidoxypropyltrimethoxysilane, β-glycidoxypropyltrimethoxysilane, γ-glycidoxypropyltriethoxysilane, β-glycidoxypropyltriethoxysilane, γ-glycidoxypropylmethyldimethoxysilane, γ-glycidoxypropylmethyldiethoxysilane and β-(3.4-epoxycyclohexyl)ethyltrimethoxysilane.

Examples of the dispersant for the hard coat composition include glycols, aliphatic cyclic ketones, acetates, alcohols and other solvents.

The glycols include ethylene glycol monomethyl ether acetate, ethylene glycol monoethyl ether acetate, ethylene glycol monopropyl ether acetate, ethylene glycol monobutyl ether acetate, propylene glycol monomethyl ether acetate, propylene glycol monoethyl ether acetate, propylene glycol monopropyl ether acetate, propylene glycol monobutyl ether acetate, ethylene glycol dimethyl ether, ethylene glycol diethyl ether, ethylene glycol dipropyl ether, ethylene glycol dibutyl ether, diethylene glycol dimethyl ether, diethylene glycol diethyl ether, diethylene glycol dipropyl ether, diethylene glycol dibutyl ether, propylene glycol dimethyl ether, propylene glycol diethyl ether, propylene glycol monomethylether, ethylene glycol monoethylether and ethylene glycol monobutyl ether.

The aliphatic cyclic ketones include cyclohexanone, o-methylcyclohexanone, m-methylcyclohexanone and p-methylcyclohexanone.

The acetates include ethyl acetate, n-propyl acetate and n-butyl acetate.

The alcohols include methanol, ethanol, 1-propanol, 2-propanol and 1-butanol.

The other solvents include solvent naphtha and methyl ethyl ketone.

The hard coat composition may contain water in an amount 1 to 10 times its theoretically stoichiometric amount to hydrolyze the epoxy-containing silicon compound of the above formula (2).

The hard coat composition further contains a curing catalyst.

Examples of the curing catalyst include chelate compounds, fatty acid salts, primary to tertiary amines, polyalkylene amines, sulfonates, magnesium perchlorates and ammonium perchlorates. These compounds may be used in combination with an organic mercaptan and mercaptoalkylenesilane.

The chelate compounds include compounds containing Al, Zr, Co, Zn, Sn, Mn, V, Cu, Ce, Cr, Ru, Ga, Cd or Fe as a central metal and acetyl acetone, di-n-butoxide-mono-ethyl acetate, di-n-butoxide-mono-methyl acetate, methyl ethyl ketoxime, 2,4-hexanedione, 3,5-heptanedione or acetoxime as an coordination compound.

The fatty acid salts include metal salts of fatty acids such as 2-ethyl-hexanoic acid, stearic acid, lauric acid, oleic acid, acetic acid, sebacic acid, dodecanoic diacid, propionic acid, brassylic acid, isobutyric acid, citraconic acid and diethylene amine tetraacetic acid.

More specific examples of the chelate compounds and fatty acid salts include alkali metal salts and ammonium salts of carboxylic acids, metal salts and ammonium salts of acetylacetone, metal salts of ethyl acetoacetate and metal salts having acetylacetone and ethyl acetoacetate by coordination.

Further, the above primary to tertiary amines are preferably aliphatic amines, aromatic amines and aminosilanes. Examples of these amines include polymethylene diamine, polyether diamine, diethylene triamine, iminobispropyl amine, bishexamethylene triamine, diethylene triamine, tetraethylene pentaamine, pentaethylene hexaamine, pentaethylene hexaamine, dimethylaminopropylamine, aminoethylethanolamine, methyliminobispropylamine, menthanediamine, N-aminomethylpiperazine, 1,3-diaminocyclohexane, isophoronediamine, metaxylylenediamine, tetrachloroparaxylenediamine, methaphenilenediamine, 4,4'-methylenediamine, diaminodiphenylsulfone, benzidine, toluidine, diaminodiphenyl ether, 4,4'-thiodianiline, 4,4'-bis(o-toluidine) dianisidine, o-phenylenediamine, 2,4-toluenediamine, methylenebis(o-chloroaniline), diaminoditolylsulfone, bis(3,4-diaminophenyl)sulfone, 2,6-diaminopyridine, 4-chloro-o-phenylenediamine, 4-methoxy-6-methyl-m-phenylenediamine, m-aminobenzylamine, N,N,N',N'-tetramethyl-1,3-butanediamine, N,N,N',N'-tetramethyl-p-phenylenediamine, tetramethylguanidine, triethanolamine, 2-dimethylamino-2-hydroxypropane, N,N'-dimethylpiperazine, N,N'-bis[(2-hydroxy)propyl]piperazine, N-methylmorpholine, hexamethylenetetramine, pyridine, pyrazine, quinoline, benzyldimethylamine, α-methylbenzylmethylamine, 2-(dimethylaminomethyl) phenol, 2,4,6-tris(dimethylaminomethylol)phenol, N-methylpiperazine, pyrrolidine, morpholine, N-β(aminoethyl)γ-aminopropyltrimethoxysilane, γ-aminopropyltrimethoxysilane, γ-aminopropyltriethoxysilane, N-β(aminoethyl) γ-aminopropylmethyldimethoxysilane, γ-aminopropylmethyldimethoxysilane and γ-aminopropylmethyldiethoxysilane.

The above hard coat composition may contain a leveling agent, lubricity providing agent, ultraviolet light absorber, antioxidant, antistatic agent, bluing agent and the like as required. The leveling agent and the lubricity providing agent are particularly preferably a copolymer of a polyoxyalkylene and polydimethylsiloxane or a copolymer of a polyoxyalkylene and fluorocarbon. They may be contained in the hard coat composition in an amount of 0.001 to 10 wt %.

The application of the hard coat composition to the primer coat of the transparent laminate may be carried out by dip-coating, flow-coating, spin-coating, spray-coating or the like. After application, the hard coat composition is heated at 90 to 120° C. for 1 to 24 hours to form a cured coating film. The thickness of the coating film is preferably 0.5 to 5 μm, more preferably 1.0 to 4.0 μm. When the thickness of the coating film is smaller than 0.5 μm, the hardness may lower and when the thickness of the coating film is larger than 5 μm, the film may crack.

An anti-reflection coat may be further formed on the hard coat of the transparent laminate of the present invention.

Reflection can be suppressed and transmission and weatherability can be improved by forming the anti-reflection film consisting of a single layer or multiple layers of an inorganic substance on the hard coat.

SiO, $SiO_2$, $Si_3N_4$, $TiO_2$, $ZrO_2$, $Al_2O_3$, $MgF_2$ or $Ta_2O_5$ is used as the inorganic substance to form a thin film by vacuum deposition.

Prior to the formation of the hard coat, it is effective that the lens substrate should be subjected to a pre-treatment such as alkali treatment, acid treatment, plasma treatment, corona treatment or flame treatment in order to improve its adhesion to the hard coat.

The transparent laminate of the present invention is particularly suitable for use as a plastic lens for spectacles but it can also be used as safety spectacles which require impact resistance and a transparent plastic plate which requires impact resistance.

Effect of the Invention

According to the present invention, there is obtained a primer composition which does not need to be thermally cured at a high temperature and has stability for a longtime. There is also obtained a transparent laminate, for example, aplastic lens for spectacles, which comprises the above primer composition and has high impact resistance, high heat resistance, excellent weatherability, high hardness and high film adhesion even when a transparent anti-reflection coat is formed.

EXAMPLES

Examples of the present invention will be described hereinbelow.

Examples and Comparative Examples

Examples of Preparation of Primer (1) 127 g of diethylene glycol monobutyl ether (trade name of Daicel Chemical Industry Co., Ltd.: Butyl Diglycol) and 507 g of distilled water were mixed together, and 0.5 g of the Florad FC-430 of 3M Limited was added as a leveling agent to the obtained solution. 162 g of the Neo Rez R-9679 (water dispersion of fine particles of a linear polyurethane having a pendant carboxylic acid group and no crosslinked structure between polymer chains, the linear polyurethane had no bisphenol A skeleton, solids content: 37%, elongation: 350%, 100% modulus: 406 kgf/cm$^2$, manufactured by Abisia Co., Ltd.) was added to the above mixed solution under agitation to prepare a uniform solution. Thereafter, 200 g of a $SiO_2$ sol 1 (dispersed in 2-propanol, average particle diameter of 10 nm, nonvolatile content of 30%, the surface of each $SiO_2$ fine particle was made hydrophobic by a propyl group) was added to the above solution and stirred until a uniform solution was obtained, and the resultant was taken as a primer 1.

(2) 119 g of diethylene glycol monobutyl ether (Butyl Diglycol) and 477 g of distilled water were mixed together, and 0.5 g of the Florad FC-171 of 3M Limited was added as a leveling agent to the obtained solution. 200 g of the Adecabontiter HUX-350 (water dispersion of fine particles of a linear polyurethane having a pendant carboxylic acid group and no crosslinked structure between polymer chains, the linear polyurethane had no bisphenol A skeleton, solids content: 30%, elongation: 450%, 100% modulus: 200 kgf/cm$^2$, manufactured by Asahi Denka Kogyo K.K.) was added to the above mixed solution under agitation to prepare a uniform solution. Thereafter, 200 g of a $SiO_2$ sol 2 (dispersed in n-propyl cellosolve, average particle diameter of 10 nm, nonvolatile content of 30%, the surface of each $SiO_2$ fine particle was made hydrophobic by an ethylene glycol group having a propyl group at one terminal) was added to the above solution and stirred until a uniform solution was obtained, and the resultant was taken as a primer 2.

(3) A primer 3 was obtained in the same manner as in (1) above except that 127 g of diethylene glycol monobutyl ether (Butyl Diglycol) used for the preparation of the primer 1 in (1) above was changed to 127 g of diacetone alcohol.

(4) 142 g of ethylene glycol monobutyl ether (butyl cellosolve) and 568 g of distilled water were mixed together, and 1 g of the SILWET L-77 of Nippon Unicar Co., Ltd. was added as a leveling agent to the obtained solution. 203 g of the Neo Rez R-9679 was added to the mixed solution under agitation to prepare a uniform solution. Thereafter, 83 g of a $SiO_2$ sol 1 was added and stirred until a uniform solution was obtained, and the resultant was taken as a primer 4.

(5) 122 g of diethylene glycol monobutyl ether (Butyl Diglycol) and 487 g of distilled water were mixed together, and 0.5 g of the Florad FC-430 of 3M Limited was added as a leveling agent to the obtained solution. 188 g of the Adecabontiter HUX-320 (water dispersion of fine particles of a linear polyurethane having a pendant carboxylic acid group and no crosslinked structure between polymer chains, the linear polyurethane had a bisphenol A skeleton, solids content: 32%, elongation: 250%, 100% modulus: 360 kgf/cm$^2$, manufactured by Asahi Denka Kogyo K.K.) was added to the above mixed solution under agitation to prepare a uniform solution. Thereafter, 200 g of a composite oxide sol 1 comprising $TiO_2$, $ZrO_2$ and $SiO_2$ ($TiO_2$:$ZrO_2$:$SiO_2$= 78.5:1.5:19.0, dispersed in methanol, average particle diameter of 10 nm, nonvolatile content of 30%, the surface of each composite oxide fine particle was treated with a silane having a methacryloxy group-substituted alkyl group) was added to the above solution and stirred until a uniform solution was obtained, and the resultant was taken as a primer 5.

(6) A primer 6 was obtained in the same manner as in (5) above except that the same amount of a composite oxide sol 2 surface treated with a silane having a glycidyloxy group-substituted alkyl group was used in place of the composite oxide sol 1 surface treated with a methacryloxy group-substituted alkyl group used for the preparation of the primer 5 in (5) above.

(7) 129 g of diethylene glycol monobutyl ether (Butyl Diglycol) and 388 g of distilled water were mixed together, and 0.5 g of the Florad FC-430 of 3M Limited was added as a leveling agent to the obtained solution. 342 g of the Adecabontiter HUX-320 was added to the mixed solution under agitation to prepare a uniform solution. Thereafter, 135 g of the composite oxide sol 1 was added and stirred until a uniform solution was obtained, and the resultant was taken as a primer 7.

(8) A primer 8 was obtained in the same manner as the primer 2 except that 119 g of 3-methoxy-3-methyl-1-butanol was used in place of 119 g of diethylene glycol monobutyl ether (Butyl Diglycol) used for the preparation of the primer 2 in (2) above.

(9) A primer 9 was obtained in the same manner as the above primer 7 except that 129 g of ethylene glycol monoacetate was used in place of 129 g of diethylene glycol monobutyl ether used for the preparation of the primer 7 in (7) above.

Comparative Examples of Preparation of Primer

(10) A primer 10 was obtained in the same manner as the above primer 1 except that 127 g of ethanol was used in place of 127 g of diethylene glycol monobutyl ether (Butyl Diglycol) used for the preparation of the primer 1 in (1) above.

(11) 119 g of diethylene glycol monobutyl ether (Butyl Diglycol) and 476 g of distilled water were mixed together, and 0.5 g of the Florad FC-430 of 3M Limited was added as a leveling agent to the obtained solution. 200 g of the Superflex 150 (water dispersion of fine particles of a crosslinked polyurethane, nonvolatile content: 30%, elongation: 331%, 100% modulus: 191 kgf/cm$^2$, manufactured by Dai-ichi Kogyo Seiyaku Co., Ltd.) was added to the mixed solution under agitation to prepare a uniform solution. Thereafter, 200 g of the $SiO_2$ sol 1 was added and stirred until a uniform solution was obtained, and the resultant was taken as a primer 11.

(12) 1 g of the SILWET L-77 of Nippon Unicar Co., Ltd. was added as a leveling agent to 625 g of methanol and 70 g of distilled water. 160 g of the Superflex 107 (water dispersion of fine particles of a crosslinked polyurethane, nonvolatile content: 25%, elongation: 250%, 100% modulus: 85 kgf/cm$^2$, manufactured by Dai-ichi Kogyo Seiyaku Co., Ltd.) was added to the mixed solution under agitation to prepare a uniform solution. Thereafter, 133 g of the $SiO_2$ sol 3 (dispersed in methanol, average particle diameter of 10 nm, nonvolatile content of 30%, the surface of each $SiO_2$ fine particle was made hydrophobic by a methyl group) was added and stirred until a uniform solution was obtained, and the resultant was taken as a primer 12.

(13) A primer 13 was obtained in the same manner as the above primer 5 except that the $SiO_2$ sol 4 (dispersed in water, average particle diameter of 10 nm, not surface modified, nonvolatile content of 30%, pH of 10) was used in place of the SiO$_2$ sol 1 used for the preparation of the primer 1 in (1) above.

(14) A primer 14 was obtained in the same manner as the above primer 5 except that ethanol was used in place of diethylene glycol monobutyl ether (Butyl Diglycol) used for the preparation of the primer 5 in (5) above.

(15) 163 g of diethylene glycol monobutyl ether (Butyl Diglycol) and 650 g of distilled water were mixed together, and 0.5 g of the Florad FC-430 of 3M Limited was added as a leveling agent to the obtained solution. 100 g of the Superflex 107 (the above crosslinked polyurethane) was added to the mixed solution under agitation to prepare a uniform solution. Thereafter, 83 g of the composite oxide sol 2 was added and stirred until a uniform solution was obtained, and the resultant was taken as a primer 15.

(16) 6 g of the L-77 of Nippon Unicar Co., Ltd. was added as a leveling agent to 659 g of methanol. 158 g of the Superflex 150 (the above crosslinked polyurethane) was added to the obtained mixed solution under agitation to prepare a uniform solution. Thereafter, 177 g of the composite oxide sol 2 was added and stirred until a uniform solution was obtained, and the resultant was taken as a primer 16.

(17) A primer 17 was obtained in the same manner as the primer 5 except that a cerium oxide sol not surface treated (dispersed in water, pH of 3.5, average particle diameter of 8 nm, nonvolatile content of 30%, stabilized with acetic acid) was used in place of the composite oxide sol 1 used for the preparation of the primer 5 in (5) above.

(18) A primer 18 was obtained in the same manner as the primer 5 except that a composite oxide sol 3 surface treated with a silane having an amino group was used in place of the composite oxide sol 1 surface treated with a silane having a methacryl group used for the preparation of the primer 5 in (5) above.

(19). A primer 19 was obtained in the same manner as the above primer 5 except that a composite oxide sol 4 surface treated with a silane having an ureido group was used in place of the composite oxide sol 1 surface treated with a silane having a methacryl group used for the preparation of the primer 5 in (5) above.

Examples of Preparation of Hard Coat (1) 183 g of a SiO$_2$ sol (dispersed in water, average particle diameter of 10 nm, nonvolatile content of 40%, pH of 3) was weighed and 155 g of γ-glycidoxypropyltrimethoxysilane was gradually added to the sol under agitation and cooling and further stirred for 1 hour after the end of addition. Thereafter, 512 g of 1-methoxy-2-propanol and 28 g of itaconic acid were added and dissolved in the obtained solution under agitation to prepare a uniform solution. Further, 122 g of a SiO$_2$ sol (dispersed in water, average particle diameter of 10 nm, nonvolatile content of 30%, pH of 10) was added at a time and 0.4 g of the L-7001 (silicone surfactant, manufactured by Nippon Unicar Co., Ltd.) was added as a leveling agent and stirred for 1 hour. The obtained mixed solution was aged at 30° C. for 48 hours to obtain a hard coat solution 1.

(2) 327 g of a composite oxide sol 5 comprising TiO$_2$, Fe$_2$O$_3$ and SiO$_2$ (TiO$_2$:Fe$_2$O$_3$:SiO$_2$=82:0.7:18, dispersed in methanol, average particle diameter of 10 nm, nonvolatile content of 30%) and 110 g of distilled water were weighed and mixed together. 169 g of γ-glycidoxypropyltrimethoxysilane was gradually added to the obtained mixed solution under agitation and further stirred for 1 hour after the end of addition. Thereafter, 387 g of 1-methoxy-2-propanol and 2 g of tetraethylene glycol monomethacrylate were added to the above solution. 4 g of acetylacetone aluminum as a curing catalyst and 0.4 g of the L-7001 (silicone surfactant, manufactured by Nippon Unicar Co., Ltd.) were further added as a leveling agent and stirred for 1 hour. The obtained mixed solution was aged at 25° C. for 48 hours to obtain a hard coat solution 2.

Examples of Production of Coat Lens

After the above primer and hard coat solutions were prepared, they were left at room temperature for 3 days and applied.

The following two different types of plastic lens substrates A and B were prepared. A: lens of diethylene glycol bisallyl carbonate (refractive index of 1.50, obtained by thermally molding and curing the CR-39 monomer of PPG Co., Ltd.) B: lens of thiourethane resin (refractive index of 1.66, obtained by thermally molding and curing the MR-39 monomer of Mitsui Chem., Inc.)

After the above lens substrates were cleaned and dried, they were dipped in each of the above primer solutions at a lift rate of 10 cm/min, dried at room temperature for 5 minutes and heated at 50° C. for 10 minutes. After cooling at room temperature, they were further dipped in each of the above hard coat solutions at a lift rate of 15 cm/min, dried at room temperature for 5 minutes and heated at 120° C. for 60 minutes.

Further, ZrO$_2$, SiO$_2$, ZrO$_2$ and SiO$_2$ were vacuum deposited on these substrates in this order to a thickness of λ/4 each sequentially to form an anti-reflection coat.

Examples of Evaluation of Performance of Coated Lens

The lenses having a primer coat, hard coat and anti-reflection coat were evaluated by the following methods and their properties are shown in Table 1. adhesion test:

A cross hatch test was made in accordance with the crosscut adhesion test JISK5400. That is, 100 squares were formed by cutting the surface of a film with a knife to draw 11 parallel lines at intervals of 1 mm in both longitudinal and transverse directions, cellophane adhesive tape was affixed to the cut film and then removed, and the number of squares which the film was not removed and was adhered to the substrates was counted and expressed by %. film hardness test:

A film was rubbed back and forth 10 times with steel wool #0000 under a load of 1 kg to evaluate the hardness of the film according to the scratch of the film based on the following criteria.

5: not scratched at all
4: slightly scratched
3: scratched
2: badly scratched
1: scratched to the substrate Measurement of Film Thickness:

Primer and hard coat solutions were applied to a glass plate under the same conditions as described above and cured separately, part of the coats was shaved off, and the thickness of the film was obtained from the level difference.

Impact Resistance:

A 16.32 g heavy steel ball was set at a height of 525 mm and dropped on the convex surface of a lens by giving an initial speed thereto to make a break-down test by increasing the initial speed stepwise and repeating dropping the ball in accordance with ANSI Z80.1. Impact resistance is expressed as impact resistant collision energy (J) which is an intermediate value (mean value of 5 samples) between the amount of collision energy when the lens is broken or cracked and the amount of collision energy when the lens is not broken or cracked before that. According to FDA standards, this value needs to be 0.2J or more. A plastic lens having a minus diopter and a center thickness of 1.0 to 1.3 mm was used as the lens substrate.

Before measurement, the lens was left in a 20° C. atmosphere for 24 hours and then a ball drop test was carried out at room temperature (20° C.).

Weatherability:

A xenon weather-o-meter weatherability promotion tester (black panel temperature of 63° C., water was sprayed for 18 minutes every 2 hours, exposure intensity of 0.35 W/m$^2$ at 340 nm) was used to evaluate the appearance and adhesion of each lens after 240 hours of exposure.

Heat Resistance:

Lenses were left in a 60° C. atmosphere for 60 minutes and judged based on the existence of cracking, a test was made on non-cracked lenses by increasing the ambient temperature in increments of 5° C. until the lenses were cracked, and the upper limits of temperatures at which the lenses were not cracked are shown as heat resistance.

Stability of Solution:

The solution was stored at 20° C. for 3 months and the state of the solution and the appearances of the coating films were observed.

The refractive index of the primer coat was 1.50 and the refractive index of the hard coat was 1.48 in Example 1, and the refractive index of the primer coat was 1.65 and the refractive index of the hard coat was 1.64 in Example 5.

TABLE 1

|  | primer solution No. | hard coat solution No. | lens substrates | stability of primer solution | thickness of primer coat (μm) | thickness of hard coat (μm) |
| --- | --- | --- | --- | --- | --- | --- |
| Ex. 1 | 1 | 1 | A | no change | 1.5 | 3.0 |
| Ex. 2 | 2 | 1 | A | no change | 2.0 | 3.0 |
| Ex. 3 | 3 | 1 | A | no change | 1.4 | 3.0 |
| Ex. 4 | 4 | 1 | A | no change | 1.8 | 3.0 |
| Ex. 5 | 5 | 2 | B | no change | 1.3 | 2.0 |
| Ex. 6 | 6 | 2 | B | no change | 1.3 | 2.0 |
| Ex. 7 | 7 | 2 | B | no change | 2.0 | 2.0 |
| Ex. 8 | 8 | 1 | A | no change | 2.0 | 3.0 |
| Ex. 9 | 9 | 2 | B | no change | 2.0 | 2.0 |
| C.Ex. 1 | 10 | 2 | A | gelled after 3 days | — | — |
| C.Ex. 2 | 11 | 1 | A | gelled after 4 weeks | 1.7 | 3.0 |
| C.Ex. 3 | 12 | 1 | A | gelled after 7 weeks | 1.2 | 2.0 |
| C.Ex. 4 | 13 | 1 | A | no change | 1.4 | 3.0 |
| C.Ex. 5 | 14 | 2 | B | gelled after 3 days | — | — |
| C.Ex. 6 | 15 | 2 | B | no change | 1.1 | 2.0 |
| C.Ex. 7 | 16 | 2 | B | gelled after 4 weeks | 0.4 | 2.0 |
| C.Ex. 8 | 17 | 2 | B | gelled after 7 weeks | 1.2 | 2.0 |
| C.Ex. 9 | 18 | 2 | B | gelled after 7 weeks | 1.1 | 2.0 |
| C.Ex. 10 | 19 | 2 | B | gelled after 7 weeks | 1.2 | 2.0 |

Ex.: Example
C.Ex.: Comparative Example

TABLE 2

|  | appearance | hardness | adhesion | weatherability | heat resistance | impact resistance |
| --- | --- | --- | --- | --- | --- | --- |
| Ex. 1 | satisfactory | 4~5 | 100% | satisfactory | 80° C. | 0.4 J |
| Ex. 2 | satisfactory | 4~5 | 100% | satisfactory | 80° C. | 0.4 J |
| Ex. 3 | satisfactory | 4~5 | 100% | satisfactory | 80° C. | 0.4 J |
| Ex. 4 | satisfactory | 4~5 | 100% | satisfactory | 75° C. | 0.8 J |
| Ex. 5 | satisfactory | 4~5 | 100% | satiafactory | 80° C. | 0.8 J |
| Ex. 6 | satisfactory | 4~5 | 100% | satisfactory | 80° C. | 0.9 J |
| Ex. 7 | satisfactory | 4~5 | 100% | satisfactory | 75° C. | 1.3 J |
| Ex. 8 | satisfactory | 4~5 | 100% | satisfactory | 80° C. | 0.4 J |
| Ex. 9 | satisfactory | 4~5 | 100% | satisfactory | 75° C. | 1.3 J |
| C.Ex. 1 | — | — | — | — | — | — |
| C.Ex. 2 | satisfactory | 4~5 | 100% | satisfactory | 70° C. | 0.1 J |
| C.Ex. 3 | satisfactory | 4~5 | 100% | satisfactory | 65° C. | 0.1 J |
| C.Ex. 4 | whitened | 4~5 | 100% | — | — | — |
| C.Ex. 5 | — | — | — | — | — | — |
| C.Ex. 6 | whitened | 4~5 | 100% | — | — | — |
| C.Ex. 7 | whitened | 4~5 | 100% | — | — | — |
| C.Ex. 8 | whitened | 4~5 | 100% | — | — | — |
| C.Ex. 9 | whitened | 4~5 | 100% | — | — | — |
| C.Ex. 10 | whitened | 4~5 | 100% | — | — | — |

Ex.: Example
C.Ex.: Comparative Example

What is claimed is:

1. A liquid primer composition comprising:
   (A) a self-emulsifiable emulsion of a linear polyurethane having a pendant carboxylic acid group and no crosslinked structure between polymer chains;
   (B) a sol of an inorganic oxide having a hydrophobic group on a surface of the inorganic oxide; and
   (C) a compound having 5 to 9 carbon atoms and at least one hydroxyl group and at least one oxygen atom other than an oxygen atom constituting a hydroxyl group in the molecule.

2. A transparent laminate comprising a transparent plastic substrate and a coating film formed on at least one side of the substrate, wherein
   the coating film is formed by applying and curing a liquid primer composition comprising:
   (A) a self-emulsifiable emulsion of a linear polyurethane having a pendant carboxylic acid group and no crosslinked structure between polymer chains;
   (B) a sol of an inorganic oxide having a hydrophobic group on a surface of the inorganic oxide; and
   (C) a compound having 5 to 9 carbon atoms and at least one hydroxyl group and at least one oxygen atom other than an oxygen atom constituting a hydroxyl group in the molecule.

3. The transparent laminate of claim 2, wherein a coating film of the self-emulsifiable emulsion (A) has an elongation of 240 to 500% and a 100% modulus of 190 kgf/cm² or more.

4. The transparent laminate of claim 3, wherein the linear polyurethane of the self-emulsifiable emulsion (A) has a bisphenol A skeleton.

5. The transparent laminate of claim 2, wherein the linear polyurethane of the self-emulsifiable emulsion (A) has a bisphenol A skeleton.

6. The transparent laminate of claim 2, wherein the liquid primer composition comprises 5 to 400 parts by weight, in terms of an inorganic oxide, of the component (B) and 50 to 3,000 parts by weight of the component (C) based on 100 parts by weight, in terms of nonvolatile matter, of the component (A).

7. The transparent laminate of claim 2, wherein the hydrophobic group is at least one member selected from the group consisting of an alkyl group, acryloxy group-substituted alkyl group, methacryloxy group-substituted alkyl group, glycidyloxy group-substituted alkyl group and alkylene glycol group having an alkyl group at one terminal.

8. The transparent laminate of claim 2, wherein the inorganic oxide of the sol (B) is a fine particle of at least one oxide selected from the group consisting of oxides of Si, Al, Sn, Sb, Ta, Ce, La, Fe, Zn, W, Zr, In and Ti and the surface of the fine particle is modified by an organic silane compound represented by the following formula (1) to have a hydrophobic group on the surface:

$$R^1R^2_a SiX_b \quad (1)$$

wherein $R^1$ is an alkyl group which may be substituted by a methacryloxy group or glycidyloxy group, $R^2$ is an alkyl group, X is a hydrolyzable group, a is 0, 1 or 2, and b is 1, 2 or 3, with the proviso that a+b=3.

9. The transparent laminate of claim 2, wherein the inorganic oxide of the sol (B) is a composite oxide containing at least 50 wt % of titanium oxide.

10. The transparent laminate of clam 2, wherein the component (C) is at least one member selected from the group consisting of monoalkyl ether of alkylene glycol, monoalkyl ether of polyalkylene glycol, monoacyl ester of alkylene glycol, monoacyl ester of polyalkylene glycol, 3-methoxy-3-methyl-1-butanol and diacetone alcohol.

11. The transparent laminate of claim 2 which further comprises a hard coat on the coating film of the liquid primer composition.

12. The transparent laminate of claim 11, wherein the hard coat is formed by applying and curing a composition comprising (D) a sol of an inorganic oxide which is a fine particle having a particle diameter of 1 to 100 nm of an oxide selected from the group consisting of oxides of Si, Al, Sn, Sb, Ta, Ce, La, Fe, Zn, W, Zr, In and Ti and (E) an epoxy-containing silicon compound represented by the following formula (2) or a hydrolyzate thereof:

$$R^3R^4_d Si(OR^5)_{3-d} \quad (2)$$

wherein $R^3$ is a group having an epoxy group and 2 to 12 carbon atoms, $R^4$ is an alkyl group or haloalkyl group having 1 to 6 carbon atoms, alkenyl group having 2 to 6 carbon atoms, phenyl group or halophenyl group, $R^5$ is a hydrogen atom, alkyl group having 1 to 4 carbon atoms or acyl group, and d is 0, 1 or 2.

13. The transparent laminate of claim 11 which further has an anti-reflection coat on the hard coat.

14. A plastic lens for spectacles which comprises the transparent laminate of claim 13.

15. A plastic lens for spectacles which comprises the transparent laminate of claim 11.

* * * * *